(12) United States Patent
Hsu et al.

(10) Patent No.: US 10,336,253 B1
(45) Date of Patent: Jul. 2, 2019

(54) VEHICLE SIDE OBSTACLE DETECTING AND WARNING METHOD AND DETECTING AND WARNING SYSTEM OF VEHICLE SIDE OBSTACLE

(71) Applicant: Winwise Tech Co.,Ltd., Changhua County (TW)

(72) Inventors: Chan-Wei Hsu, Changhua County (TW); Hsueh-Lung Liao, Changhua County (TW); Shih-Feng Chiang, Changhua County (TW)

(73) Assignee: Winwise Tech Co., Ltd., Changhua County (TW)

( * ) Notice: Subject to any disclaimer, the term of this patent is extended or adjusted under 35 U.S.C. 154(b) by 0 days.

(21) Appl. No.: 16/141,963

(22) Filed: Sep. 25, 2018

(51) Int. Cl.
*G08G 1/16* (2006.01)
*B60Q 9/00* (2006.01)

(52) U.S. Cl.
CPC .................................. *B60Q 9/008* (2013.01)

(58) Field of Classification Search
CPC ...................................................... B60Q 9/008
See application file for complete search history.

(56) References Cited

U.S. PATENT DOCUMENTS

| | | | | |
|---|---|---|---|---|
| 5,926,126 A | * | 7/1999 | Engelman | B60K 31/0008 340/435 |
| 6,014,608 A | * | 1/2000 | Seo | G01C 21/3602 340/903 |
| 6,370,475 B1 | * | 4/2002 | Breed | B60N 2/2863 340/436 |
| 6,720,920 B2 | * | 4/2004 | Breed | B60N 2/2863 342/357.31 |
| 2013/0304300 A1 | * | 11/2013 | Peake | B62D 15/025 701/23 |

\* cited by examiner

*Primary Examiner* — Joseph H Feild
*Assistant Examiner* — Pameshanand Mahase
(74) *Attorney, Agent, or Firm* — CKC & Partners Co., LLC (57) ABSTRACT

A vehicle side obstacle detecting and warning method is applied on a vehicle. The vehicle side obstacle detecting and warning method includes providing a measuring step for measuring a dataset of the vehicle. The vehicle side obstacle detecting and warning method includes providing a detector installing step for positioning a plurality of detectors between the front wheel and the rear wheel according to the maximum inner wheel difference area. The vehicle side obstacle detecting and warning method includes providing a detected area adjusting step for adjusting a detecting distance or a positioning angle of at least one of the detectors to form a detected area. The vehicle side obstacle detecting and warning method includes providing a detecting and warning step for sending a warning message by a warning module disposed at the vehicle when an obstacle is detected by any one of the detectors within the detected area.

13 Claims, 7 Drawing Sheets

VEHICLE SIDE OBSTACLE DETECTING AND WARNING METHOD AND DETECTING AND WARNING SYSTEM OF VEHICLE SIDE OBSTACLE

BACKGROUND

Technical Field

The present disclosure relates to a detecting and warning method and a detecting and warning system. More particularly, the present disclosure relates to a vehicle side obstacle detecting and warning method and a detecting and warning system of a vehicle side obstacle.

Description of Related Art

Vehicles include front wheels and rear wheels, and an inner wheel difference is caused by the turning radius difference between the front wheel and the rear wheel when the vehicles are taking a turn. The inner wheel difference is large while the vehicle is large, and the axle distance between the front wheel and the rear wheel is large.

Recently, many accidents are occurred because of misjudgments of inner wheel difference from pedestrians, bikes or motorcycles, and the blind spot of the drivers. In order to decrease the accidents and to improve the driving safety, some practitioners developed a warning method of the inner wheel difference. In such method, some lamp units are disposed at the vehicle and project light onto an inner wheel difference area on the road for warning the pedestrians. However, this kind of method is passive, and the driver cannot be warned on time. The effect thereof is limited.

Based on the abovementioned problems, how to develop a vehicle side obstacle detecting and warning method to effectively warn the drivers becomes a pursuit target for practitioners.

SUMMARY

The present disclosure provides a vehicle side obstacle detecting and warning method applied on a vehicle. The vehicle side obstacle detecting and warning method includes providing a measuring step for measuring a dataset of the vehicle. A maximum inner wheel difference area between a front wheel and a rear wheel of the vehicle is obtained according to the dataset, and the maximum inner wheel difference area has an outer boundary. The vehicle side obstacle detecting and warning method includes providing a detector installing step for positioning a plurality of detectors between the front wheel and the rear wheel according to the maximum inner wheel difference area. The vehicle side obstacle detecting and warning method includes providing a detected area adjusting step for adjusting a detecting distance or a positioning angle of at least one of the detectors to form a detected area. The detected area has a detected boundary, and the detected boundary is farther from the vehicle than the outer boundary is. The vehicle side obstacle detecting and warning method further includes providing a detecting and warning step for sending a warning message by a warning module disposed at the vehicle when an obstacle is detected by any one of the detectors within the detected area.

The present disclosure provides another vehicle side obstacle detecting and warning method applied on a vehicle. The vehicle side obstacle detecting and warning method includes providing a measuring step for measuring a dataset of the vehicle. A maximum inner wheel difference area between a front wheel and a rear wheel of the vehicle is obtained according to the dataset, and the maximum inner wheel difference area has an outer boundary. The vehicle side obstacle detecting and warning method includes providing a detector installing step for positioning a plurality of detectors between the front wheel and the rear wheel according to the maximum inner wheel difference area. The vehicle side obstacle detecting and warning method includes providing a detected area adjusting step for adjusting a detecting distance or a positioning angle of at least one of the detectors to form a detected area. The detected area has a detected boundary, and the detected boundary is farther from the vehicle than the outer boundary is. The vehicle side obstacle detecting and warning method further includes providing a detecting and warning step for separating the detected area to form a warning zone. The warning zone has a warning boundary, and the warning boundary is closed to the outer boundary. When an obstacle is detected by any one of the detectors within the waring zone, a warning module disposed at the vehicle sends a warning message.

The present disclosure provides a detecting and warning system of a vehicle side obstacle applied on a vehicle. A maximum inner wheel difference area is included between a front wheel and a rear wheel of the vehicle, and the detecting and warning system of the vehicle side obstacle includes a plurality of detectors, a processing module and a warning module. The detectors are disposed between the front wheel and the rear wheel of the vehicle. A detecting distance or a positioning angle of at least one of the detectors is different from the detecting distances or the positioning angles of the other detectors. A detected area is detected by the detectors. The detected area has a detected boundary, and the detected boundary is farthest from the vehicle than an outer boundary of the maximum inner wheel difference area is. The processing module is signally connected to the detectors for receiving signals from the detectors. The warning module is electrically connected to the processing module. When an obstacle is detected by any one of the detectors within the detected area, the warning module is controlled by the processing module to send a warning message.

BRIEF DESCRIPTION OF THE DRAWINGS

The disclosure can be more fully understood by reading the following detailed description of the embodiments, with reference made to the accompanying drawings as follows.

DETAILED DESCRIPTION

The embodiment will be described with the drawings. For clarity, some practical details will be described below. However, it should be noted that the present disclosure should not be limited by the practical details. That is, in some embodiment, the practical details are unnecessary. In addition, for simplifying the drawings, some conventional structures and elements will be simply illustrated, and repeated elements may be represented by the same labels.

It will be understood that when an element (or mechanism or module) is referred to as be "disposed on", "connected to" or "coupled to" another element, it can be directly disposed on, connected or coupled to the other element, or it can be indirectly disposed on, connected or coupled to the other element, that is, intervening elements may be present. In contrast, when an element is referred to as be "directly disposed on," "directly connected to" or "directly coupled to" another element, there are no intervening elements present.

In addition, the terms first, second, third, etc. is used herein to describe various elements or components, these elements or components should not be limited by these terms. Consequently, a first element or component discussed below could be termed a second element or component.

Figure 1:
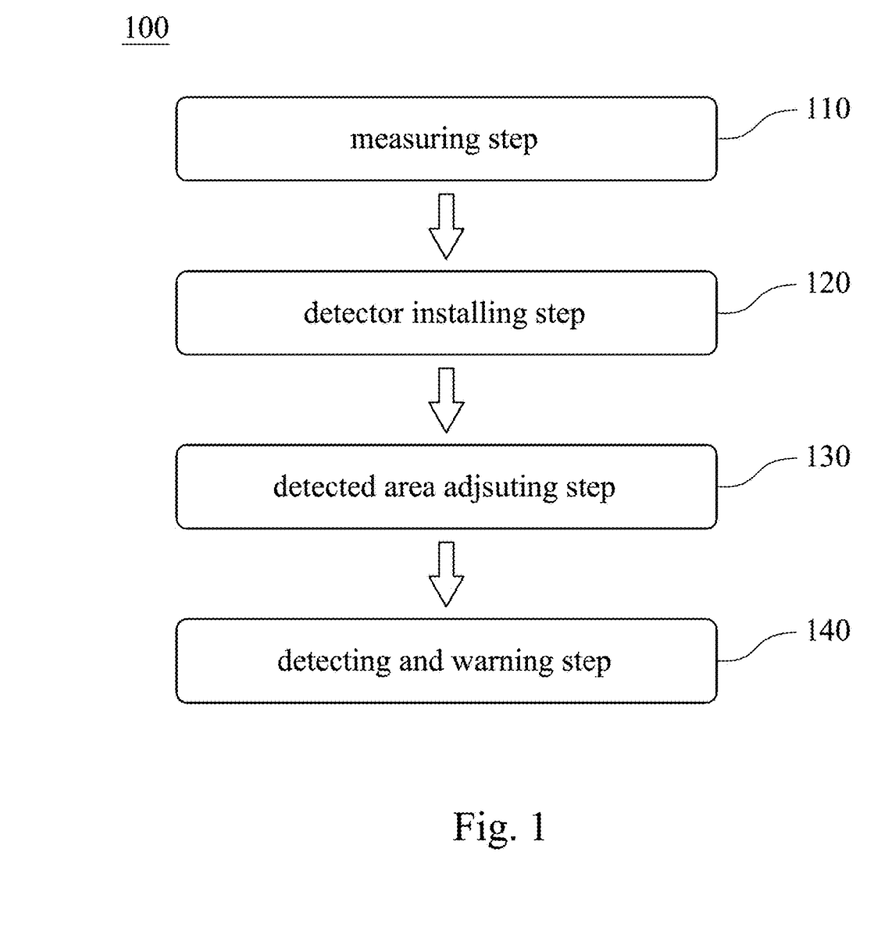
FIG. 1 shows a flow chart of a vehicle side obstacle detecting and warning method according to one embodiment of the present disclosure.
Figure 2:
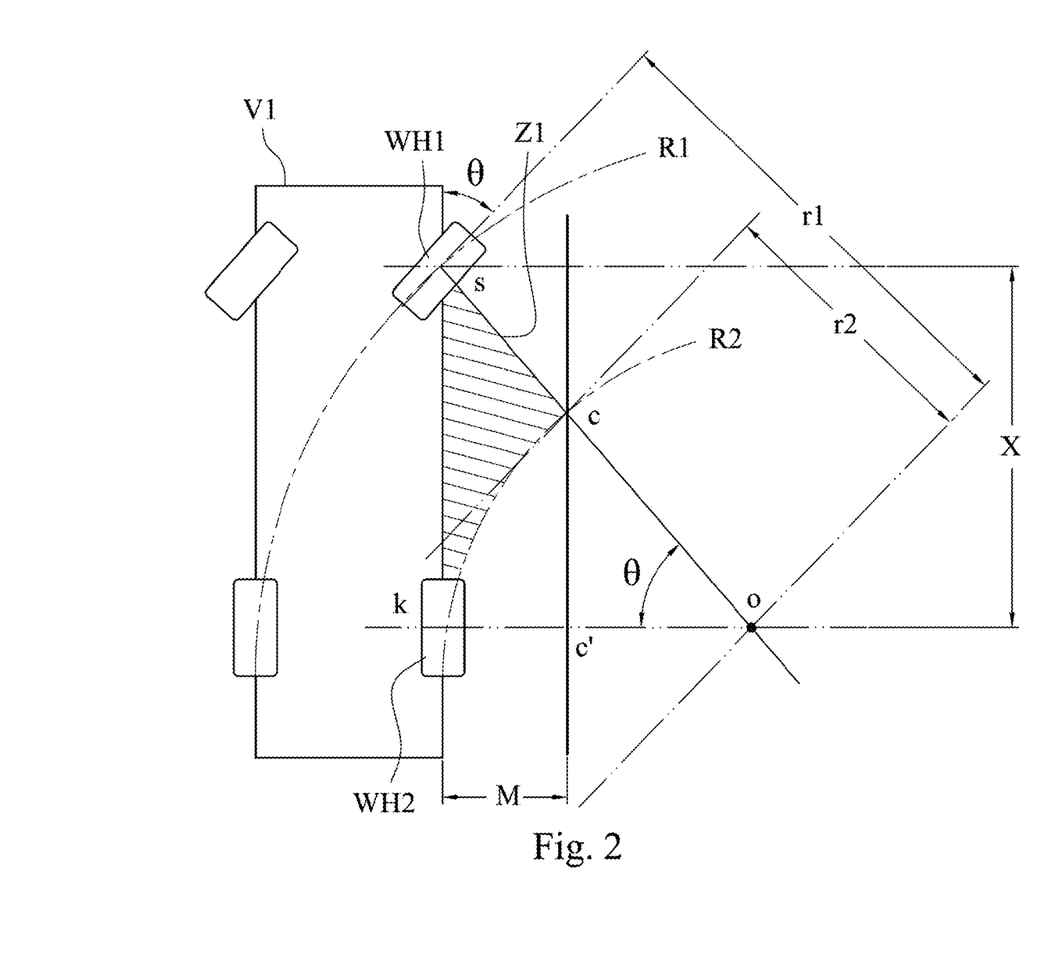
FIG. 2 shows an illustration of a measuring step of the vehicle side obstacle detecting and warning method of FIG. 1.
Figure 3:
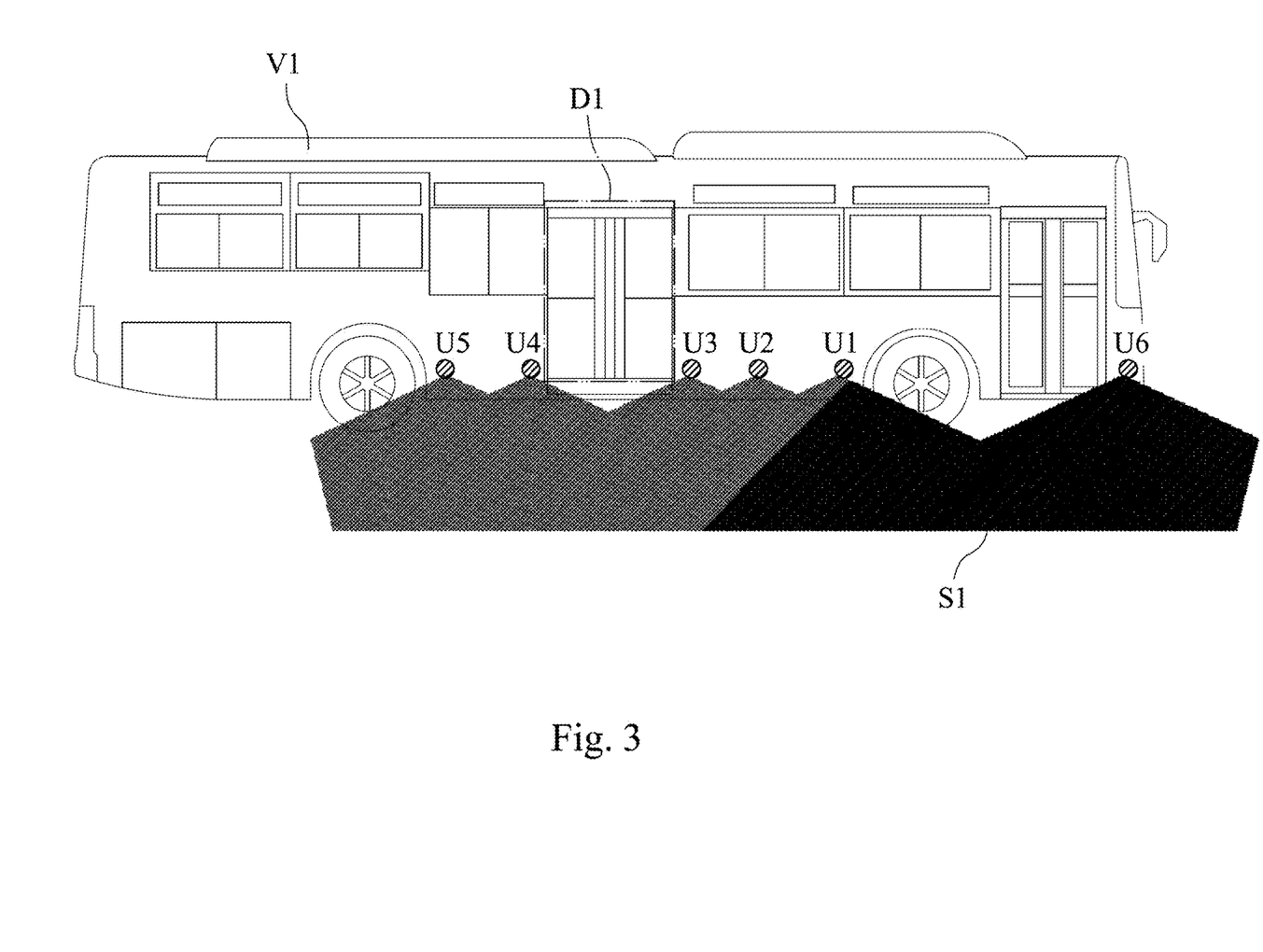
FIG. 3 shows an illustration of a detector installing step of the vehicle side obstacle detecting and warning method of FIG. 1.
Figure 4:
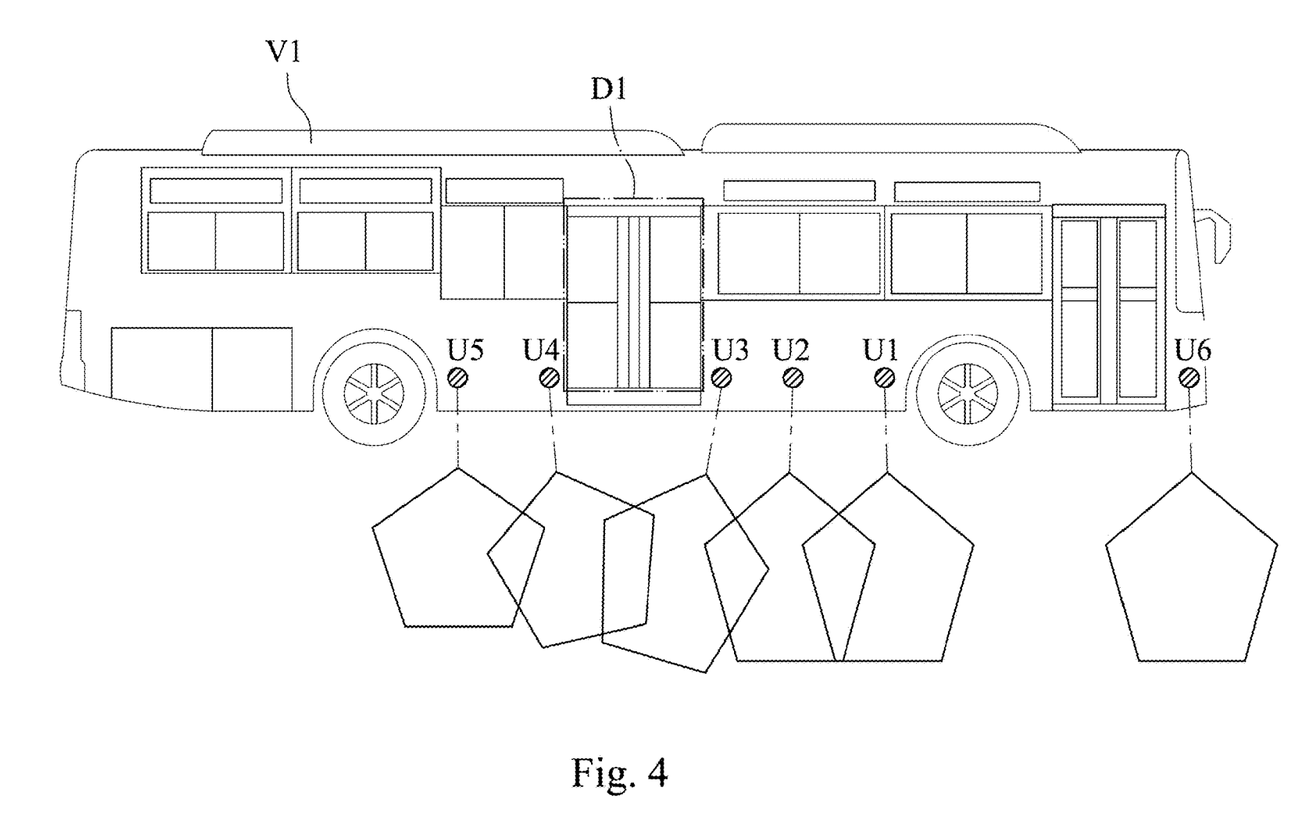
FIG. 4 shows an illustration of a detected area adjusting step of the vehicle side obstacle detecting and warning method of FIG. 1.
Figure 5:
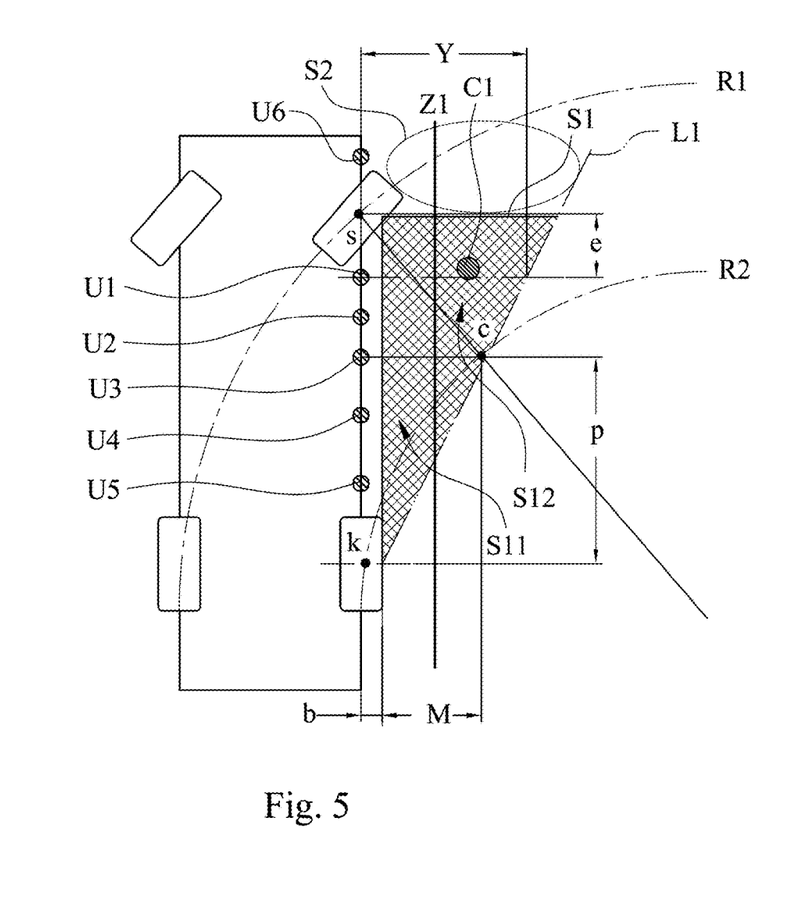
FIG. 5 shows an illustration of a detected area of the vehicle side obstacle detecting and warning method of FIG. 1.

Please refer to FIG. 1, FIG. 2, FIG. 3, FIG. 4 and FIG. 5. FIG. 1 shows a flow chart of a vehicle side obstacle detecting and warning method 100 according to one embodiment of the present disclosure. FIG. 2 shows an illustration of a measuring step 110 of the vehicle side obstacle detecting and warning method 100 of FIG. 1. FIG. 3 shows an illustration of a detector installing step 120 of the vehicle side obstacle detecting and warning method 100 of FIG. 1. FIG. 4 shows an illustration of a detected area adjusting step 130 of the vehicle side obstacle detecting and warning method 100 of FIG. 1. FIG. 5 shows an illustration of a detected area S1 of the vehicle side obstacle detecting and warning method 100 of FIG. 1. The vehicle side obstacle detecting and warning method 100 is applied on a vehicle V1 and includes the measuring step 110, the detector installing step 120, the detected area adjusting step 130 and a detecting and warning step 140.

In the measuring step 110, a dataset of the vehicle V1 is measured. A maximum inner wheel difference area Z1 between a front wheel WH1 and a rear wheel WH2 of the vehicle V1 is obtained according to the dataset, and the maximum inner wheel difference area Z1 has an outer boundary which is indicated by a curved line between a wheel center k of the rear wheel WH2 and an outermost point c shown in FIG. 2.

In the detector installing step 120, a plurality of detectors U1, U2, U3, U4, U5 are disposed between the front wheel WH1 and the rear wheel WH2 according to the maximum inner wheel difference area Z1.

In the detected area adjusting step 130, a detecting distance or a positioning angle of at least one of the detectors is adjusted to form a detected area S1. The detected area S1 has a detected boundary L1, and the detected boundary L1 is farther from the vehicle V1 than the outer boundary is.

In the detecting and warning step 140, a warning message is sent by a warning module disposed at the vehicle V1 when an obstacle C1 is detected by any one of the detectors U1-U5 within the detected area S1.

Therefore, the detectors U1-U5 are installed based on the dataset of different vehicle V1 to form a proper detected area S1. Then the detectors U1-U5 can be used to detect the detected area S1 to check whether the obstacle C1 appears there within such that active warning is achieved, and the driving safety can be efficiently improved. The details of the vehicle side obstacle detecting and warning method 100 will be described in the following paragraphs.

In the measuring step 110, an axle distance X between the front wheel WH1 and the rear wheel WH2 is measured first. As shown in FIG. 2, the axle distance X is the distance between the wheel center s of the front wheel WH1 and the wheel center k of the rear wheel WH2. Then a maximum turning angle θ of the front wheel WH1 of the vehicle V1 is measured to obtain a radius r1 of a circle R1 of the front wheel WH1, which is equal to the distance between the wheel center s and the central point o, according to the equation (1). Sequentially, a radius r2 of a circle R2 of the rear wheel WH2, which is equal to the distance between the outmost point c and the central point o, can be obtained according to the equation (2). Finally, based on the similar triangle theory (the triangle formed by the wheel center s, the wheel center k and the central point o being similar to the triangle formed by the outermost point c, the virtual point c' and the central point o) and the equation (3), a maximum inner wheel difference distance M between the outermost point c and the vehicle V1, which is equal to the distance between the virtual point c' and the wheel center k, can be obtained. The maximum turning angle θ is about 40 degrees to 45 degrees. In the embodiment of FIG. 2, the axle distance X is equal to 5.85 m, and the maximum turning angle θ is equal to 43 degrees.

$$r1 = X/\sin\theta \tag{1}$$

$$r2 = X/\tan\theta \tag{2}$$

$$X = r2(r1-r2)/r1 = (r1-r2)(r2/r1) \tag{3}$$

As shown in FIG. 3, in the detector installing step 120, a plurality of detectors U1-U5 can be installed. A distance between the detector U1 and the wheel center s of the front wheel WH1 is equal to 0.9 m. A distance between the detector U2 and the detector U1 is equal to 1 m. A distance between the detector U3 and the detector U2 is equal to 1 m. A distance between the detector U5 and the wheel center k of the rear wheel WH2 is equal to 0.9 m. A distance between the detector U4 and the detector U5 is equal to 1 m. In other embodiment, the number and the positions of the detectors can be changed or adjusted based on the axle distance, and the detectors can be ultrasonic detectors or millimeter-wave radars.

As shown in FIG. 4, in the detected area adjusting step 130, the positioning angle of at least one of the detectors U1-U5 is adjusted according to a door dead zone D1 of the vehicle V1. In other words, at least one of the positioning angles of the two detectors U3, U4 which are closest to two sides of a door (not labeled) of the vehicle V1, respectively, is different from the positioning angles of the other detectors U1, U2, U5.

Hence, as shown in FIG. 4, each of the detection fields of the detector U3, U4 is inclined toward the door such that the problem that no detector can be disposed within the door dead zone D1 can be solved.

In addition, since the maximum inner wheel difference area Z1 is substantially triangle-shaped, the detecting distance of at least one of the detectors U1-U5 can be adjusted in order to detect whether the obstacle C1 is appeared in the maximum inner wheel difference area Z1. As shown in FIG. 4, the detecting distance of the detector U5 can be adjusted to 1.5 m. The detecting distance of the detector U4 can be adjusted to 1.7 m, and the detecting distances of the detectors U1-U3 can be adjusted to 2 m such that the detected range of the detected area S1 is changed accordingly.

Preferably, in order to match the shape of the maximum inner wheel difference area Z1, the detecting distance or the positioning angle of at least one of the detectors U1-U5 can be adjusted, and the equation a=(Y−b)/(X−e) can be satisfied. Wherein "b" represents a minimum detecting distance between the detected boundary L1 and the vehicle V1. "Y" represents a maximum detecting distance between the detected boundary L1 and the detector U1 which is closest to the front wheel WH1. "e" represents a disposing distance between the front wheel WH1 and the detector U1 that is closest to the front wheel WH1. "X" represents an axle distance between the front wheel WH1 and the rear wheel WH2. The detected boundary L1 is substantially a linear line and has a slope, and "a" represents the slope. The outermost point c of the outer boundary is located at the detected boundary L1 or inside the detected boundary L1.

In other words, the detected boundary L1 is satisfied a linear equation y=ax+b. Wherein "y" represents a distance along the width direction of the vehicle V1. "x" represents a distance along the length direction of the vehicle V1. The wheel center k can be deemed as the origin. When the maximum inner wheel difference distance M is substitute for y, the linear equation y=ax+b can be satisfied. As shown in FIG. 5, the distance between the wheel center k of each of the detectors U1-U5 can be substituted for x to obtain the corresponding detecting distance. Thus, the detected area S1 will become a triangle area which can cover the maximum inner wheel difference area Z1, and the outermost point c is located at the detected boundary L1. The area between the body of the vehicle V1 and the minimum detecting distance b is a detecting dead zone.

For example, the minimum detecting distance b between the detected boundary L1 and the vehicle V1 is equal to 0.2 m. The maximum detecting distance Y between the detected boundary L1 and the detector U1 which is closest to the front wheel WH1 is equal to 2 m. The disposing distance e between the front wheel WH1 and the detector U1 that is closest to the front wheel WH1 is equal to 0.9 m. The axle distance X between the front wheel WH1 and the rear wheel WH2 is equal to 5.85 m. Accordingly, the slope a=0.364 is obtained. Hence, the detected boundary L1 satisfies the linear equation y=0.364+0.2. Furthermore, since the maximum inner wheel difference distance M is equal to 1.7 m, and a perpendicular distance p between the outermost point c and an axis of the wheel center k of the rear wheel WH2, which is the distance between the outermost point c and the virtual point c', is equal to 4.28 m (the product of sin θ and r2). When substituting 4.28 for x, y is equal to 1.76, which is larger than 1.7. Hence, the outermost point c is located within the detected boundary L1, and the outermost point c can be detected. Under such condition, a detecting and warning speed is increased because the detected area S1 becomes smaller.

In addition, the warning module can be, but not be limited, programmed to send the warning message while the speed of the vehicle V1 is smaller than 20 km/hr. In other embodiment, the detected boundary can be a parabola or other curved line to match the shape of the maximum inner wheel difference area.

In another embodiment, the detected boundary can be set by the maximum inner wheel difference distance. Precisely, the equation a=(M−b)/(p) can be satisfied. Wherein "b" represents the minimum detecting distance between the warning boundary and the vehicle. "M" represents the maximum inner wheel difference distance between an outermost point of the outer boundary and the vehicle. "p" represents a perpendicular distance between the outermost point and a central axis of the wheel center of the rear wheel. The warning boundary is substantially a linear line and has a slope, and "a" represents the slope. If the upper numerals are substituted into the equation a=(M−b)/(p), a=0.35 is obtained. Thus, the detecting distance of the detectors can be adjusted to allow the detected boundary to satisfy the linear equation. For example, if the distance between the detector and the origin is equal to 4.95 m, the detecting distance thereof can be set to 1.93 m.

Additionally, in the detecting and warning step 140, the detected area S1 can be separated into a first zone S11 and a second zone S12, and the warning message sent while the obstacle C1 is located within the first zone S11 is different from the warning message sent while the obstacle C1 is located within the second zone S12. For example, if the obstacle C1 is located within the first zone S11, a continuous and quick whistle sound can be sent to warn the driver, and if the obstacle C1 is located within the second zone S12, a single whistle sound can be sent to warn the driver. In the embodiment shown in FIG. 5, the area extended 50 cm from the body of the vehicle V1 can be indicated as the first zone, but not limited thereto in other embodiment.

Moreover, in the detecting and warning step 140, when a turning signal (not shown) of the vehicle V1 is operated, a processing module disposed at the vehicle V1 receives signals from the detectors U1-U5 and optionally controls the warning module to send the warning message. In other words, when the turning signal is operated, the vehicle V1 is going to take a turn. Hence, the processing module can send a triggering signal to activate the detectors U1-U5, and the processing module receives the signals from the detectors U1-U5 to judge whether the obstacle C1 appears within the detected area S1 so as to control the warning module to send the warning message optionally.

Furthermore, a detector U6 can be disposed between the front of the vehicle V1 and the front wheel WH1 to form a second detected area S2. When the vehicle V1 is taking a turn, whether the obstacle C1 appears in the second detected area S2 can be detected. Please be noted that the shape of the second detected area S2 is only for illustration, and the real shape thereof is depended on the type of the detector applied thereto. In addition, in other embodiment, only one detector, e.g., the detector U6, is disposed at the vehicle V1 without other detectors U1-U5, and the purpose for detecting the obstacle C1 can also be carried out.

Figure 6:
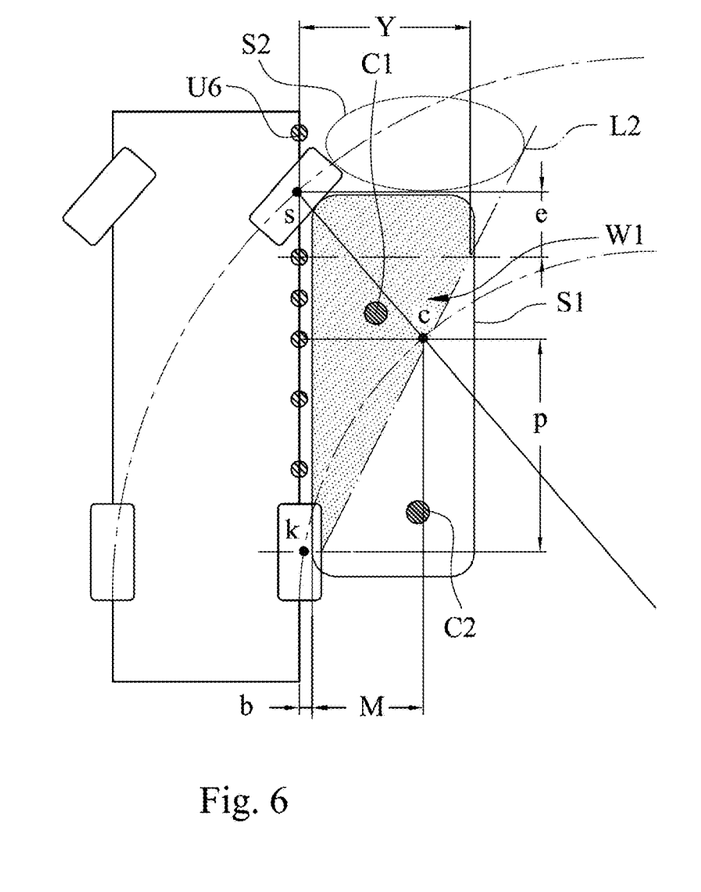
FIG. 6 shows a detected area of a vehicle side obstacle detecting and warning method according to another embodiment of the present disclosure.

Please refer to FIG. 6. FIG. 6 shows another detected area S1 of a vehicle side obstacle detecting and warning method according to another embodiment of the present disclosure. As shown in FIG. 6, the detected area S1 is separated to form a warning zone W1. When the obstacle C1 within the warning zone W1 is detected by any one of the detectors, the warning module will send the warning message. Under such condition, only the positioning angle of at least one of the detectors needs to be adjusted, and there is no need to adjust the detecting distances of the detectors such that the detected area S1 is larger. The warning zone W1 is allowed to have a warning boundary L2 when separating the warning zone W1 from the detected area S1, and the equation a=(Y−b)/(X−e) is satisfied. Wherein "b" represents a minimum detecting distance between the warning boundary L2 and the vehicle. "Y" represents a maximum detecting distance between the warning boundary L2 and the detector that is closest to the front wheel. "e" represents a disposing distance between the front wheel and one of the detectors that is closest to the front wheel. "X" represents an axle distance between the front wheel and the rear wheel. The warning boundary L2 is substantially a linear line and has a slope, and "a" represents the slope.

Hence, when the obstacle C1 or C2 is detected, the processing module which is disposed at the vehicle and signally connected to the waring module and the detectors will give a judgement. For example, if the obstacle C1 is detected, the processing module will control the warning module to send the warning message because the obstacle C1 is located within the warning zone W1. On the other hand, if the obstacle C2 is detected, the processing module will not control the warning module to send the warning message because the obstacle C2 is not located within the warning zone W1.

In other embodiment, the warning boundary can be set by the maximum inner wheel difference distance. Precisely, the equation $a=(M-b)/(p)$ can be satisfied. Wherein "b" represents the minimum detecting distance between the warning boundary and the vehicle. "M" represents the maximum inner wheel difference distance between an outermost point of the outer boundary and the vehicle. "p" represents the perpendicular distance between the outermost point and a central axis of the wheel center of the rear wheel. The warning boundary is substantially a linear line and has a slope, and "a" represents the slope.

Hence, based on the abovementioned embodiment, it is known that the detecting distance can be adjusted when forming the detected area such that the detected area is matched to the maximum inner wheel difference area, or the detected area can be separated by backend processing to form the warning zone which is matched to the maximum inner wheel difference area.

Figure 7:
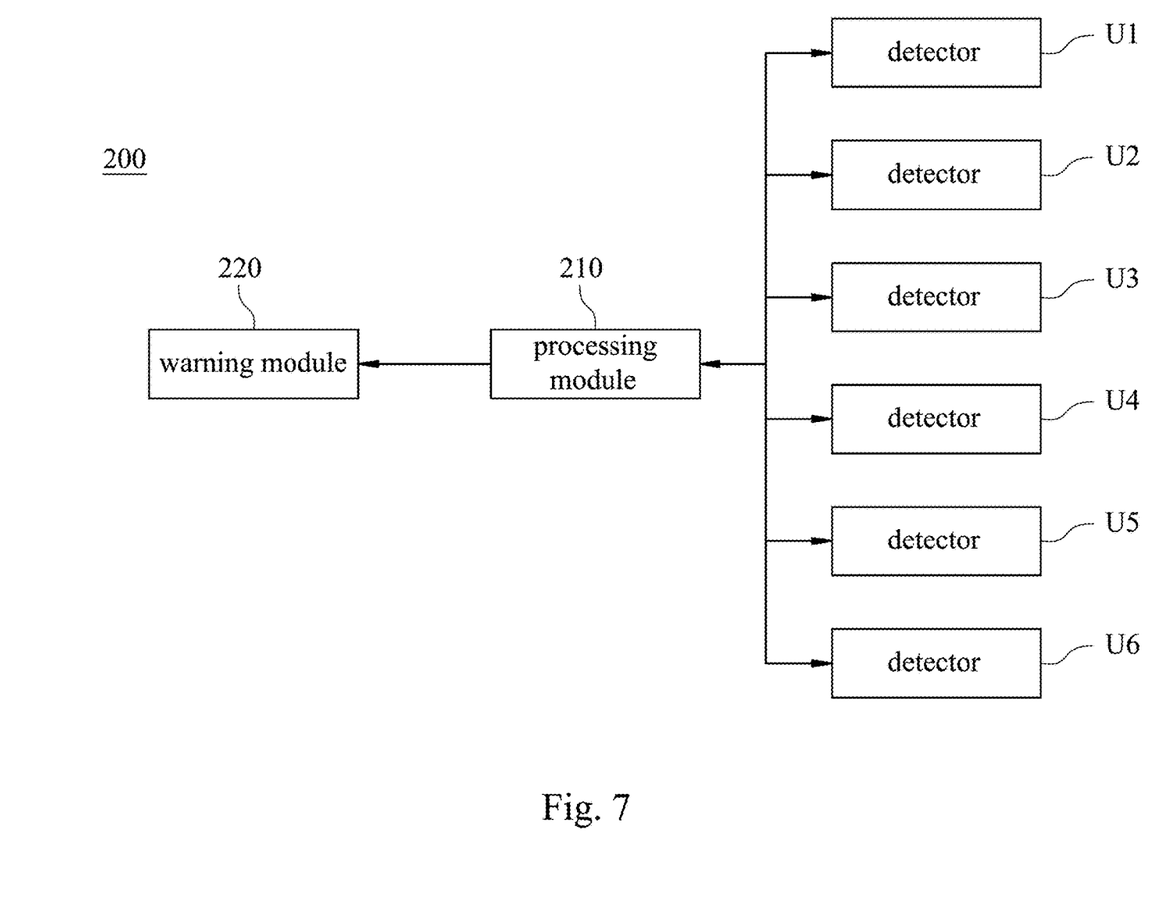
FIG. 7 shows a block diagram of a detecting and warning system of a vehicle side obstacle according to yet another embodiment of the present disclosure.

Please refer to FIG. 7, with reference to FIGS. 2 to 6. FIG. 7 shows a block diagram of a detecting and warning system 200 of a vehicle side obstacle according to yet another embodiment of the present disclosure. The detecting and warning system 200 of the vehicle side obstacle includes a plurality of detectors U1-U5, a processing module 210 and a warning module 220. The detectors U1-U5 are disposed between the front wheel WH1 and the rear wheel WH2 of the vehicle V1. A detecting distance or a positioning angle of at least one of the detectors U1-U5 is different from the detecting distances or the positioning angles of the other detectors U1-U5. A detected area S1 is detected by the detectors U1-U5. The detected area S1 has a detected boundary L1, and the detected boundary L1 is farthest from the vehicle V1 than an outer boundary of the maximum inner wheel difference area Z1 is. The processing module 210 is signally connected to the detectors U1-U5 for receiving signals from the detectors U1-U5. The warning module 220 is electrically connected to the processing module 210. When an obstacle C1 is detected by any one of the detectors U1-U5 within the detected area S1, the warning module 220 is controlled by the processing module 210 to send a warning message.

Moreover, the positioning angle of at least one of two of the detectors U3, U4 which are closest to two sides of a door of the vehicle V1, respectively, is different from the positioning angles of the other detectors U1, U2, U5. The detected area S1 can be adjusted by adjusting the detecting distance of at least one of the detectors U1-U5 to allow the detected boundary to be a linear line and satisfy the linear equation $a=(Y-b)/X$.

Instead, the detected area S1 can include a warning zone W1, and the warning zone W1 has the warning boundary L2 which is closed to the outer boundary. When the obstacle C1 within the warning zone W1 is detected by any of the detectors U1-U5, the warning module 220 is controlled by the processing module 210 to send the warning message.

Additionally, when a turning signal of the vehicle V1 is operated, the processing module 210 receives the signals from the detectors U1-U5 and optionally controls the warning module 220 to send the warning message. When a judgement of the processing module 210 is that the obstacle C1 appears within the detected area S1, the warning module is controlled by the processing module 210 to send the warning message. On the other hand, when the judgement of the processing module 210 is that the obstacle C1 does not appear within the detected area S1, the warning module will not be operated. In other words, the processing module 210 can control the warning module 220 to send the warning message optionally based on the signals from the detectors U1-U5.

Furthermore, a detector U6 can be disposed between the front of the vehicle V1 and the front wheel WH1 to form a second detected area S2. When the vehicle V1 is taking a turn, whether the obstacle C1 appears in the second detected area S2 can be detected. Please be noted that the shape of the second detected area S2 is only for illustration, and the real shape thereof is depended on the type of the detector applied thereto. In addition, in other embodiment, only one detector, e.g., the detector U6, is disposed at the vehicle V1 without other detectors U1-U5, and the purpose of detecting the obstacle C1 can also be carried out.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A vehicle side obstacle detecting and warning method, which is applied on a vehicle, comprising:
   providing a measuring step for measuring a dataset of the vehicle, wherein a maximum inner wheel difference area between a front wheel and a rear wheel of the vehicle is obtained according to the dataset, and the maximum inner wheel difference area has an outer boundary;
   providing a detector installing step for positioning a plurality of detectors between the front wheel and the rear wheel according to the maximum inner wheel difference area;
   providing a detected area adjusting step for adjusting a detecting distance or a positioning angle of at least one of the detectors to form a detected area, wherein the detected area has a detected boundary, and the detected boundary is farther from the vehicle than the outer boundary is; and
   providing a detecting and warning step for sending a warning message by a warning module disposed at the vehicle when an obstacle is detected by any one of the detectors within the detected area.

2. The vehicle side obstacle detecting and warning method of claim 1, wherein in the detected area adjusting step, the positioning angle of at least one of the detectors is adjusted according to a door dead zone of the vehicle.

3. The vehicle side obstacle detecting and warning method of claim 1, wherein in the detecting and warning step, the detected area is separated into a first zone and a second zone, and the warning message sent while the obstacle is located within the first zone is different from the warning message sent while the obstacle is located within the second zone.

4. The vehicle side obstacle detecting and warning method of claim 1, wherein in the detecting and warning step, when a turning signal of the vehicle is operated, a processing module disposed at the vehicle receives signals from the detectors and optionally controls the warning module to send the warning message.

5. The vehicle side obstacle detecting and warning method of claim 1, wherein "b" represents a minimum detecting distance between the detected boundary and the vehicle, "Y" represents a maximum detecting distance between the detected boundary and one of the detectors, which is closest to the front wheel, "e" represents a disposing distance between the front wheel and the one of the detectors that is closest to the front wheel, "X" represents an axle distance between the front wheel and the rear wheel, the detected boundary is substantially a linear line and has a slope, "a" represents the slope, and the following condition is satisfied:

$$a=(Y-b)/(X-e);$$

wherein an outermost point of the outer boundary is located at the detected boundary or inside the detected boundary.

6. A vehicle side obstacle detecting and warning method, which is applied on a vehicle, comprising:
providing a measuring step for measuring a dataset of the vehicle, wherein a maximum inner wheel difference area between a front wheel and a rear wheel of the vehicle is obtained according to the dataset, and the maximum inner wheel difference area has an outer boundary;
providing a detector installing step for positioning a plurality of detectors between the from wheel and the inner wheel according to the maximum inner wheel difference area;
providing a detected area adjusting step for adjusting a detecting distance or a positioning angle of at least one of the detectors to form a detected area, wherein the detected area has a detected boundary, and the detected boundary is farther from the vehicle than the outer boundary is; and
providing a detecting and warning step for separating the detected area to form a warning zone, wherein the warning zone has a warning boundary, the warning boundary is closed to the outer boundary, when an obstacle is detected by any one of the detectors in the waring zone, a warning module disposed at the vehicle sends a warning message.

7. The vehicle side obstacle detecting and warning method of claim 6, wherein "b" represents a minimum detecting distance between the warning boundary and the vehicle, "Y" represents a maximum detecting distance between the warning boundary and one of the detectors, which is closest to the front wheel, "e" represents a disposing distance between the front wheel and the one of the detectors that is closest to the front wheel, "X" represents an axle distance between the front wheel and the rear wheel, the detected boundary is substantially a linear line and has a slope, "a" represents the slope, and the following condition is satisfied:

$$a=(Y-b)/(X-e);$$

wherein an outermost point of the outer boundary is located at the warning boundary or inside the warning boundary.

8. The vehicle side obstacle detecting and warning method of claim 6, wherein "b" represents a minimum detecting distance between the warning boundary and the vehicle, "M" represents a maximum inner wheel difference distance between an outermost point of the outer boundary and the vehicle, "p" represents a perpendicular distance between the outermost point and a central axis of the rear wheel, the warning boundary is substantially a linear line and has a slope, "a" represents the slope, and the following condition is satisfied:

$$a=(M-b)/(p).$$

9. A detecting and warning system of a vehicle side obstacle, which is applied on a vehicle, a maximum inner wheel difference area is included between a front wheel and a rear wheel of the vehicle, the detecting and warning system of the vehicle side obstacle comprising:
a plurality of detectors disposed between the front wheel and the rear wheel of the vehicle, wherein a detecting distance or a positioning angle of at least one of the detectors is different from the detecting distances or the positioning angles of the other detectors, a detected area is detected by the detectors, the detected area has a detected boundary, and the detected boundary is farthest from the vehicle than an outer boundary of the maximum inner wheel difference area is;
a processing module signally connected to the detectors for receiving signals from the detectors; and
a warning module electrically connected to the processing module;
wherein when an obstacle is detected by any one of the detectors within the detected area, the warning module is controlled by the processing unit to send a warning message.

10. The detecting and warning system of the vehicle side obstacle of claim 9, wherein the detected area comprises a warning zone, the warning zone has a warning boundary, the warning boundary is close to the outer boundary, and when the obstacle is detected by any one of the detectors within the detected area, the processing module controls the warning module to send the warning message.

11. The detecting and warning system of the vehicle side obstacle of claim 9, wherein "b" represents a minimum detecting distance between the detected boundary and the vehicle, "Y" represents a maximum detecting distance between the detected boundary and one of the detectors, which is closest to the front wheel, "e" represents a disposing distance between the front wheel and the one of the detectors that is closest to the front wheel, "X" represents an axle distance between the front wheel and the rear wheel, the detected boundary is substantially a linear line and has a slope, "a" represents the slope, and the following condition is satisfied:

$$a=(Y-b)/(X-e);$$

wherein an outermost point of the outer boundary is located at the detected boundary or inside the detected boundary.

12. The detecting and warning system of the vehicle side obstacle of claim 9, wherein when a turning signal of the vehicle is operated, the processing module receives the signals from the detectors and optionally controls the warning module to send the warning message.

13. The detecting and warning system of the vehicle side obstacle of claim 9, wherein the positioning angle of at least one of two of the detectors which are closest to two sides of a door of the vehicle, respectively, is different from the positioning angle of the other detectors.

* * * * *